US007505648B2

(12) United States Patent
Klein et al.

(10) Patent No.: US 7,505,648 B2
(45) Date of Patent: Mar. 17, 2009

(54) DEVICE COMPRISING A POLARIZATION-INDEPENDENT MICRO-RESONATOR

(75) Inventors: Edwin Jan Klein, Enschede (NL); Douwe Harmen Geuzebroek, Enschede (NL); Alfred Driessen, Hengelo (NL)

(73) Assignee: Universiteit Twente, Enschede (NL)

( * ) Notice: Subject to any disclaimer, the term of this patent is extended or adjusted under 35 U.S.C. 154(b) by 0 days.

(21) Appl. No.: 11/564,700

(22) Filed: Nov. 29, 2006

(65) Prior Publication Data

US 2008/0123188 A1    May 29, 2008

(51) Int. Cl.
G02B 6/26    (2006.01)
G02B 6/42    (2006.01)

(52) U.S. Cl. ............................. 385/28; 385/11; 385/16; 385/17; 385/122

(58) Field of Classification Search ................ None
See application file for complete search history.

(56) References Cited

U.S. PATENT DOCUMENTS 5,537,671 A * 7/1996 Toyama et al. ............... 385/27
5,946,129 A * 8/1999 Xu et al. .................... 359/332
6,411,752 B1 * 6/2002 Little et al. .................. 385/17
2004/0257564 A1 * 12/2004 Madsen ...................... 356/364

OTHER PUBLICATIONS

Kawashima, Hiroshi et al. "Polarization Insensitive Wideband Tunable Dispersion Compensator with Integrated PLC type Polarization Diversity Circuit", The Furukawa Electric Co., Ltd, FITEL Photonics Laboratory, 6, Yawatakaigan-dori, Ichihara, Chiba, 290-8555, Japan, Mar. 5, 2006.
Grover, Rohit et al., "III-V Semiconductor Optical Micro-Ring Resonators", The Laboratory for Physical Sciences, 8050 Greenmead Drive, College Park, MD 20740 and Electrical and Computer Engineering, University of Maryland, College Park, MD 20742, May 10, 2004.

* cited by examiner

Primary Examiner—Sung H Pak
Assistant Examiner—Chad H Smith
(74) Attorney, Agent, or Firm—DeMont & Breyer LLC (57) ABSTRACT

Polarization-diverse optical devices and related methods are disclosed. In some embodiments, these devices and methods are realized by utilizing a four-port, wavelength-dependent optical coupler that is arranged to receive identical counter-propagating optical signals.

4 Claims, 8 Drawing Sheets

Figure 7D ated ring resonator 100, which consists of two linear

DEVICE COMPRISING A POLARIZATION-INDEPENDENT MICRO-RESONATOR

FIELD OF THE INVENTION

The present invention relates to optical systems in general, and, more particularly, to micro-resonators and devices that incorporate them.

BACKGROUND OF THE INVENTION

Light can be described as an electromagnetic wave that consists of periodically-varying electric "E" and magnetic "M" fields oriented at right angles to each other. Light propagates in certain intensity patterns, which are referred to as "modes." One such mode is the "transverse" mode. Transverse modes occur because of boundary conditions imposed on a light wave by a waveguide. Transverse modes are classified into different types:

TE modes (Transverse Electric) have no electric field in the direction of propagation;

TM modes (Transverse Magnetic) have no magnetic field in the direction of propagation;

TEM modes (Transverse Electromagnetic) have no electric nor magnetic field in the direction of propagation; and Hybrid modes are those which have both electric and magnetic field components in the direction of propagation.

Light traveling in an optical fiber or other dielectric waveguide forms hybrid-type modes.

Waveguides are never perfectly symmetric, nor are the forces that affect the waveguide applied in perfect symmetry around it. Any asymmetry in a waveguide, especially a single-mode waveguide, can cause differences in the manner in which polarization modes propagate through the waveguide. More particularly, due to waveguide asymmetries, the TE and TM polarization modes might experience somewhat different propagation conditions such that they: (1) travel along the waveguide at slightly different speeds and (2) experience differing amounts of attenuation. The former effect, which results in "polarization mode dispersion," causes a spreading of an optical pulse that can render it unreadable at a detector. The latter effect, known as "polarization-dependent loss," results in signal losses. Both of these problems can degrade the operation of high-performance, high-speed optical systems. For such applications, it is therefore desirable to produce optical components and systems that are effectively insensitive to polarization mode, a quality referred to herein as "polarization independence."

Polarization independence is discussed further below in the context of ring resonators.

Ring Resonators. An integrated ring resonator is a potentially very important optical device primarily for use in optical communications systems. The integrated ring resonator is seen as a promising replacement for Mach-Zehnder interferometer ("MZI")-based devices, among other devices, which are used to form optical "components" such as filters, routers, switches, and the like. The integrated ring resonator consists of a closed-loop waveguide and one, or more typically two, linear waveguides. Certain frequencies of light resonate within the loop waveguide and, as a consequence of resonator geometry, resonant light couples between the loop waveguide and the linear waveguides. The ring resonator therefore effectively functions as a highly-selective wavelength-dependent optical coupler. A device that is functionally identical to the ring resonator is the disk resonator. The difference is that rather than incorporating a ring or loop waveguide, the disk resonator includes a solid disk waveguide.

In most implementations, light energy is coupled into and out of the micro-resonator's loop waveguide via evanescent field coupling. An evanescent optical field is the portion of the optical field of guided light that extends beyond the physical surface of a waveguide. In this coupling mode, the loop waveguide is placed in close proximity to both of the linear waveguides. All of the light at the resonant wavelength is eventually transferred from one linear waveguide to the other linear waveguide. Light within a linear waveguide that is off-resonance (i.e., not at the resonance wavelength) bypasses the loop with only a small transmission loss.

Figure 1A:
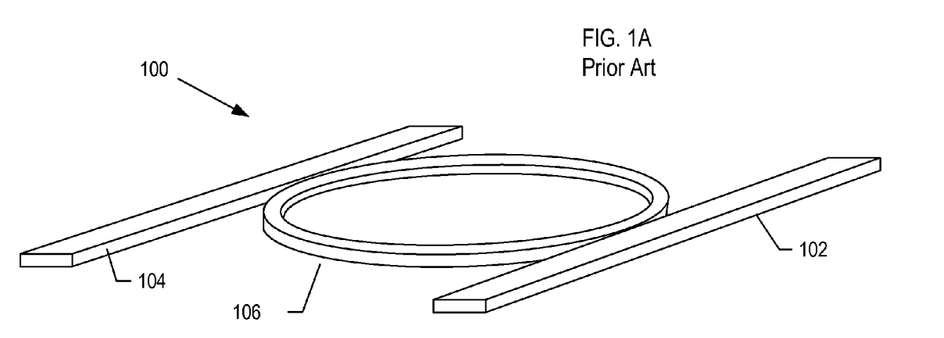
FIG. 1A depicts a laterally-coupled micro-resonator in the prior art.

Prior-Art Resonator 100. FIG. 1A depicts a typical integrated ring resonator 100, which consists of two linear waveguides 102 and 104, and a third waveguide 106 in the form of a closed loop (hereinafter "loop waveguide 106"). The loop is typically circular, oval or elliptical, but can alternatively have an arbitrarily curved circumference in the form of a distorted ring. The linear waveguides are usually termed "port waveguides" or "waveguide buses;" the former phrase will be used herein.

Figure 1B:
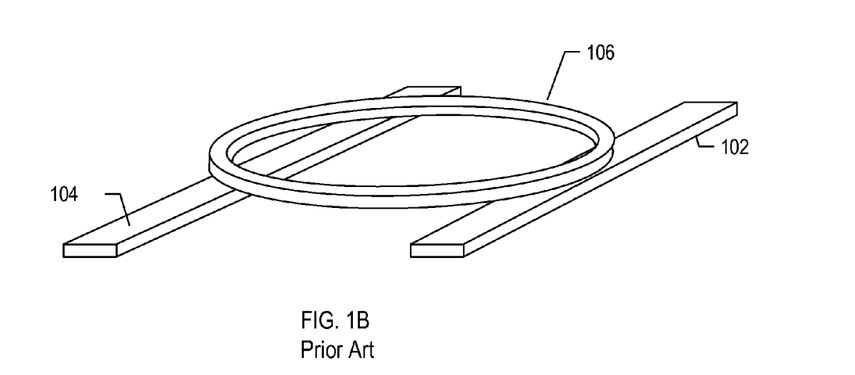
FIG. 1B depicts a vertically-coupled micro-resonator in the prior art.

Integrated ring resonators are fabricated in two geometries: "laterally coupled" and "vertically-coupled." Resonator 100 of FIG. 1A is an example of a laterally-coupled resonator. The designation "laterally coupled" refers to the fact that port waveguides 102 and 104 are in the plane of loop waveguide 106. In a vertically-coupled resonator, the port waveguides 102 and 104 are situated either both above, both below, or one above and one below loop 106 (see, FIG. 1B). Each of these two basic geometries has well-understood advantages and drawbacks.

Figure 2:
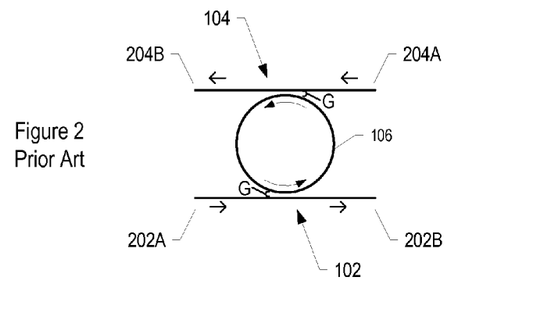
FIG. 2 schematically depicts the operation of the micro-resonator of FIG. 1.

Structure of Resonator 100. FIG. 2 depicts a schematic representation of prior-art resonator 100. As depicted in FIG. 2, resonator 100 has four ports: input port 202A and pass port 202B defined on port waveguide 102 and add port 204A and drop port 204B defined on port waveguide 104.

A portion of each of port waveguides 102 and 104 is adjacent and tangential (i.e., in the direction of a tangent) to loop waveguide 106. At this portion of the port waveguides, they are separated from loop waveguide 106 by gap G. In some embodiments, this gap is filled with air or one or more materials having a refractive index that is higher than air.

In some alternative implementations (not depicted), respective portions of each of waveguides 102 and 104 that are adjacent to loop waveguide 106 are not tangential thereto; rather, they curve around a portion of loop waveguide 106 to increase the interaction length (for coupling). In some further implementations, a vertically-coupled ring resonator includes port waveguides that are disposed orthogonally to one another (see, e.g., U.S. Pat. No. 6,411,752).

Operation of Resonator 100. Certain wavelengths of light resonate within loop waveguide 106 as a function of loop characteristics. Consider a multi-wavelength optical signal propagating in port waveguide 102 past input port 202A. Light that has a wavelength that is off-resonance with loop waveguide 106 bypasses the loop and is output from pass port 202B of port waveguide 102. Light that has a wavelength that is on-resonance couples to loop waveguide 106 via evanescent field coupling.

The on-resonance light that is coupled from port waveguide 102 propagates in loop waveguide 106 and couples to port waveguide 104 via evanescent field coupling. The light that is coupled into port waveguide 104 propagates in a direction opposite to the light traveling in port waveguide 102 due to the respective orientations of the various waveguides. As a consequence, the resonant light coupled to port waveguide 104 from port waveguide 102 via loop waveguide 106 will be output from drop port 204B. This resonant light will be joined by off-resonance light that propagates along waveguide 104 from add port 204A.

In analogous fashion, on-resonance light traveling in port waveguide 104 via add-port 204A couples to loop waveguide 106. That light couples to port waveguide 102 and propagates through pass-port 202B, along with off-resonant light from input port 202A. Resonator 100 is operated so that light propagates unidirectionally—in this example in a counter-clockwise direction—through loop waveguide 106.

Design Considerations for Resonator 100 It is desirable for resonator 100 to be very small so that: (i) its free spectral range is large and (ii) it occupies very little physical space, thereby enabling large-scale integration. In fact, a typical ring resonator has a diameter that is only one or two orders of magnitude greater than its operating wavelength. So, for a telecommunications application having an operating wavelength of about 1.55 microns, loop diameter is usually in the range of about 15 to about 150 microns.

Due to their small size, optical ring resonators are usually called "micro-resonators." That term will be used henceforth to refer to any of the many implementations of optical ring or disk resonators (e.g., circular, oval, elliptical, distorted versions thereof, etc.).

To guide light around the tight radius of curvature of loop waveguide 106, the dielectric contrast (i.e., difference in refractive indices) between the loop waveguide and surrounding medium in the plane must be large. Micro-resonators, including integrated port waveguides, are usually fabricated in substrates such as $Si/SiO_2$, GaAs/AlGaAs, and $Si_3N_4/SiO_2$ to facilitate their incorporation into optical systems. For this reason, the micro-resonators are often referred to as "integrated" micro-resonators.

In order to function properly, the effective refractive indices of loop waveguide 106 and port waveguides 102 and 104 should be as close in magnitude as possible. Another design consideration is that most applications for integrated micro-resonators require that port waveguides 102 and 104 are single mode waveguides.

In most applications, it is very important for the micro-resonator and components that incorporate it to be as insensitive as practical to the polarization state of the transverse polarization modes, the goal being polarization independence.

The Difficulty of Achieving Polarization Independence. It is quite challenging to produce a polarization-independent, integrated micro-resonator. This is due to the geometry of the resonator, which exhibits bending in the horizontal plane. This causes the TE polarization mode to experience a higher refractive index and lower losses in loop waveguide 106 than the TM polarization mode. Although it is theoretically possible to alter ring width and height to equalize the treatment of the polarization modes, a number of vexing problems arise when attempting to do so.

One problem with altering ring width and height is that not all materials can be used to fabricate the ring in the dimensions that are required for polarization independence due to factors such as material stress, refractive-index requirements, and processing constraints. A second problem is that even if a material possesses the requisite material parameters, there remains the issue of matching the refractive indices of loop waveguide 106 and port waveguides 102 and 104 while maintaining mono-modality and polarization independence of the port waveguides.

A third problem pertains to the issue of fabrication tolerances. That is, in order to produce an integrated micro-resonator with a desirably-small diameter, the resonator must be fabricated in materials that have a high dielectric contrast, as previously mentioned. This, on the basis of maintaining mono-modality, implies relatively smaller waveguides. But smaller waveguides are far less tolerant than larger waveguides to variations in the fabrication process. As a consequence, the polarization-independent behavior of integrated micro-resonators is very difficult to guarantee since even a small variation in either the width or height of loop waveguide 106 will cause polarization dependence.

Polarization Diversity as an Alternative to Polarization Independence. As will be clear from the foregoing discussion, it is difficult if not impossible to reliably manufacture polarization-independent integrated micro-resonators. In recognition of this difficulty, an alternative to controlling waveguide geometry/materials was developed in the pursuit of polarization independence. And that is to treat each polarization mode independently in separate, discrete integrated micro-resonators, thereby creating a polarization diverse arrangement of micro-resonators.

Figure 3A:
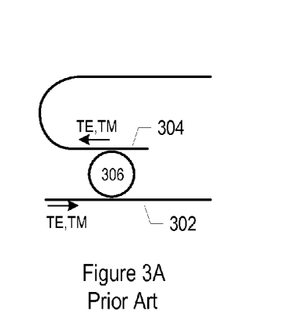
FIG. 3A depicts an idealized polarization independent micro-resonator.
Figure 3B:
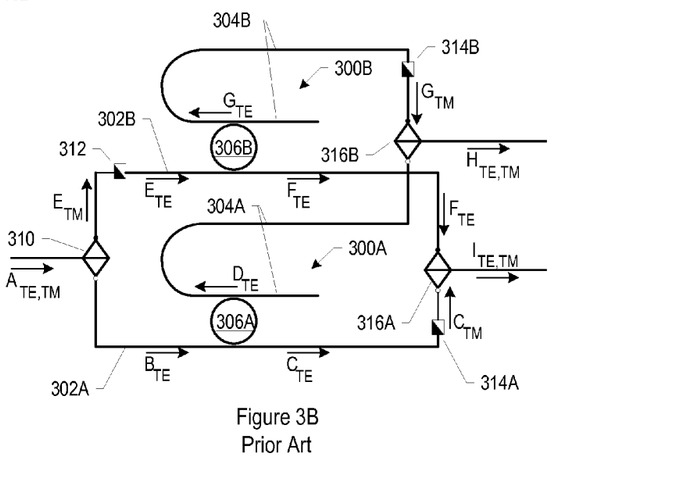
FIG. 3B depicts a polarization-diverse implementation of a micro-resonator in the prior art.

FIGS. 3A and 3B provide illustrations of a wavelength filter implemented via micro-resonators to illustrate the distinction between polarization independence and polarization diversity.

In FIG. 3A, the filter is implemented using a single micro-resonator 300 having port waveguides 302 and 304 and loop waveguide 306. On-resonance wavelengths of an input optical signal propagating along port waveguide 302 couple to loop waveguide 306 and then to port waveguide 304 for drop. Off-resonance wavelengths pass the loop waveguide. Since the traverse modes (TE and TM) are not separated, the micro-resonator must exhibit polarization independence. In this regard, the resonator depicted in FIG. 3A is an idealized layout, since polarization independence cannot be assured.

FIG. 3B depicts a polarization-diverse implementation of a filter equivalent to the filter of FIG. 3A. The filter depicted in FIG. 3B includes polarization splitter 310, two micro-resonators 300A and 300B, three polarization rotators 312, 314A, and 314B, and two polarization combiners 316A and 316B.

Those skilled in the art are familiar with the use of polarization splitters, polarization rotators, and polarization combiners and, as such, only a brief description of these components will be provided.

A polarization splitter is used to separate the polarization components TE and TM into separate signals. The operation should be wavelength-independent and the resultant signals should have the same wavelengths. Polarization splitters have been implemented via passive or active directional couplers, asymmetric Y-junction couplers, multimode interference couplers, 2-d grating couplers, and photonic crystals, to name a few.

A polarization combiner is simply a polarization splitter that is run in reverse. In other words, a TE and a TM signal having the same wavelength(s) are combined into a single signal.

A polarization rotator maneuvers linearly-polarized light about an optical axis, and can change the polarization state of a signal from TE to TM or vice-versa. Examples of polarization rotators include, without limitation, optical rotators, Faraday rotators, and half-wave plates.

With continued reference to FIG. 3B, at the input of the filter, polarization splitter 310 is used to separate multi-wavelength optical signal A, which exhibits both TE and TM mode polarizations, into two signals B and E each having different transverse polarizations. Signal B, which has TE polarization, propagates along port waveguide 302A. Signal E, which has TM polarization, propagates along port waveguide 302B. The polarization of signal E is immediately converted to TE in polarization rotator 312.

After polarization conversion of signal E, both signals B and E have the same polarization (TE in this case). On-resonance light from signal B couples into loop waveguide 306A and then to port waveguide 304A as signal D heading toward polarization combiner 316B for drop. Similarly, on-resonance light from signal E couples into loop waveguide 306B and then to port waveguide 304B as signal G heading toward polarization rotator 314B. The polarization of signal G is then converted back to TM in polarization rotator 314B. Signal G having TM polarization is then combined with signal D having TE polarization in polarization combiner 316B to form signal H having TE and TM polarizations. The filter drops signal H.

In summary, the following operations are conducted in the polarization-diverse arrangement described above:
(i) splitting the original signal A into two signals with different polarizations;
(ii) changing the polarization of one of those signals so that the two signals have the same polarization;
(iii) providing the two signals to duplicate parts of the filter;
(iv) extracting on-resonance wavelengths from the two signals via two wavelength-dependent optical couplers, creating two new signals;
(v) changing the polarization of one of the new signals so that the two new signals have different polarizations; and
(vi) recombining the two signals.

Operation (ii), which involves changing the polarization of one of the signals so that both signals have the same polarization, ensures that the two signals B and E (and signals based thereon) will respond identically to prevailing travel conditions. It also enables the system to be optimized for a particular mode; in this case, the TE mode. Operation (iii) ensures that the two signals (i.e., B and E) will experience identical travel conditions.

Regarding off-resonance signals F and C, the polarization state of signal C is converted to TM in polarization rotator 314A and led to polarization combiner 316A. Signal F, which has TE polarization, is also led to polarization combiner 316A. Signals C and F are then combined in polarization combiner 316A to form "pass" signal I, which exhibits both TE and TM polarizations.

The polarization-diverse scheme depicted in FIG. 3B solves many of the aforementioned design and fabrication problems that otherwise arise when designing a polarization-independent filter. Unfortunately, this solution introduces a new set of problems.

The Drawbacks of Existing Polarization-Diverse Layouts. One problem introduced by the polarization-diverse scheme depicted in FIG. 3B is that additional chip area is required to implement the filter due to its enlarged footprint (compared to the filter of FIG. 3A). But more problematic are the difficulties that pertain to the control of the resonance frequency of the complementary pair(s) of micro-resonators in the filter.

In particular, it is one thing to design a micro-resonator to operate at a particular resonance frequency, but it is quite another for a fabricated micro-resonator to actually operate (without modification) at the design resonance frequency. In fact, micro-resonators usually require some form of "tuning" to operate at a design resonance frequency. Regardless of any deviation from design parameters, tuning is often required to implement some desired functionality (e.g., switching, modulation, etc.). Most micro-resonator designs therefore employ some type of active tuning, such as electro-optic or thermo-optic, to adjust resonance frequency.

Since tuning requires an electronic driver for each individual micro-resonator, and each driver and the tuning method have an associated power dissipation, the power dissipation is approximately linearly dependent on the number of micro-resonators. The power requirement for a polarization diverse implementation is therefore approximately twice that of an implementation that uses polarization-independent micro-resonators, were such a polarization-independent arrangement possible.

Furthermore, since each micro-resonator must be connected to a driver, the pin count of the polarization-diverse implementation is greater than would otherwise be the case. Also, the polarization-diverse scheme requires the resonance frequencies of the complementary micro-resonators to be the same in order to avoid signal degradation.

These strict requirements increase the complexity of the driver electronics and add to the number of device parameters the must be validated during manufacturing of prior-art polarization-diverse optical systems. All of the foregoing issues increase the costs of a polarization-diverse implementation relative to a polarization-independent implementation of an optical filter.

A need exists, therefore, for optical components that are effectively insensitive to polarization (either via true polarization-independence or via polarization-diversity) but that avoid at least some of the drawbacks of the prior-art.

SUMMARY OF THE INVENTION

The present invention provides polarization-diverse optical components that avoid some of the costs and disadvantages of the prior art.

Optical components in accordance with the illustrative embodiment of the invention include a wavelength-dependent optical coupler that is used differently than in prior-art polarization-diverse components. In particular, in polarization-diverse optical components disclosed herein, a single optical coupler, which in the illustrative embodiment is a micro-resonator, receives counter-propagating optical signals having the same polarization state. This is in contrast to the prior art, wherein optical signals having the same polarization state are routed in unidirectional fashion to a complementary pair of micro-resonators (see, e.g., FIG. 3B).

The polarization-diverse implementation disclosed herein is enabled by the fact that a micro-resonator (or other four-port, wavelength-dependent optical coupler) can be used bi-directionally. This behavior is depicted in FIG. 4 in the context of four-port, wavelength-dependent optical coupler 400.

Figures 4, 5A:
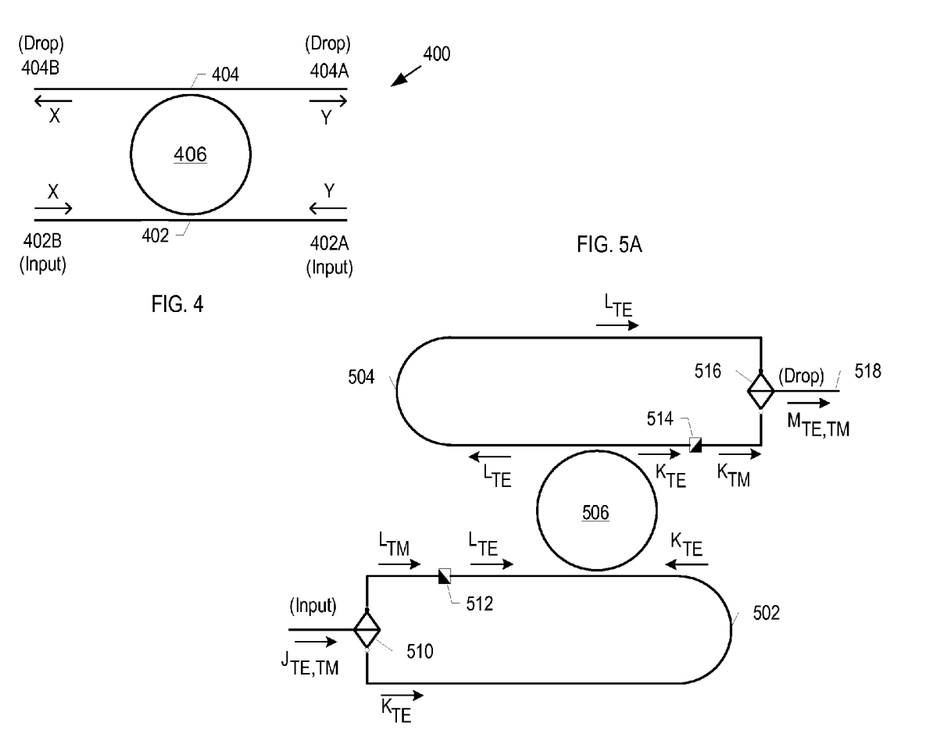
FIG. 4 depicts the bidirectional behavior of prior-art micro-resonators.
FIG. 5A depicts a polarization-diverse implementation of a micro-resonator in accordance with the illustrative embodiment of the present invention.

As shown in FIG. 4, signal X enters port waveguide 402 at input port 402B and signal Y enters port waveguide 402 at input port 402A. These signals have the same wavelength, $\lambda_1$, and are propagating in opposite directions toward loop waveguide 406. The resonance wavelength of loop waveguide 406 is $\lambda_1$, and, as such, the signals X and Y are field coupled to the loop and then to port waveguide 404. Due to the geometry of the device 400, signal Y propagates in the clockwise direction and is dropped at port 404A. In similar fashion, signal X propagates in the counter clockwise direction and is dropped at port 404B.

The ability of two propagating light beams to pass through one another without interaction, as will occur in loop waveguide 406 in the embodiment that is depicted in FIG. 4, is well known. Furthermore, the bi-directional behavior of micro-resonators is understood. But what was not recognized until now was that these behaviors could be used to provide improved implementations of polarization-diverse optical devices.

Polarization-diverse optical components that are implemented in accordance with the present teachings therefore:
   Avoid the shortcomings of prior-art polarization-diverse arrangements discussed above because only one micro-resonator is required for every two that are used in the prior art.
   Avoid the problems that otherwise prevail when trying to fabricate polarization-independent micro-resonators because the implementation of the micro-resonator disclosed herein is polarization diverse, not polarization independent.

DETAILED DESCRIPTION

The terms appearing below are provided with the following explicit definitions for use in understanding the specification and interpreting the appended claims:
   A spectral component of a multi-wavelength optical signal is a signal that is derived from the multi-wavelength and that has less than all the wavelengths that were present in the original multi-wavelength signal. Often, a spectral component will have one primary wavelength. In that sense, the term "spectral component" can sometimes be synonymous with "wavelength." For example, consider a multi-wavelength signal that is de-multiplexed in a demultiplexer. The demultiplexer resolves or separates the signal into a plurality of signals having different wavelengths. These plural signals are each "spectral components" of the multi-wavelength signal.
   Evanescent-coupling relation refers to a relationship between two or more elements, typically optical waveguides, wherein an optical signal traveling through one of the elements is capable of coupling at least some of its optical energy, via evanescent field coupling, into the other element. This relationship implies that the two elements are suitably close to one another so that the evanescent field from an optical signal traveling through one of the elements extends to the other element.
   Optical device or optical component or optical system refers to one or more elements that controls (e.g., directs, routes, attenuates, amplifies, splits, combines, etc.) or produces light. The term "optical device," "optical component," and "optical system" are to be considered synonymous and will be used interchangeably herein.
   Counter-propagating signals refers to signals that approach a four-port wavelength-selective optical coupler from sufficiently different directions such that they will exit the coupler propagating in opposite directions (e.g., on a port waveguide). Counter-propagating signals need not be heading in opposite (180-degree opposed) directions. For example, in some embodiments, the signals will be propagating along waveguides that are orthogonal to one another.
   Wavelength-selective optical coupler refers to a device that is able to extract or otherwise segregate a particular wavelength (spectral component) from other wavelengths that are present in an optical signal. The heart of the device is usually a resonant element. Often, the optical coupler will have four ports, typically implemented via two waveguides that deliver signals to and from a resonant element. Examples of wavelength-selective optical couplers include micro-resonators, Fabry-Perot filters, MZI interferometers, grating couplers, and the like.

FIG. 5A depicts a basic embodiment of a polarization-diverse optical component in accordance with the illustrative embodiment of the present invention. This component, which is a wavelength filter, is functionally analogous to the wavelength filter that is depicted in FIG. 3B (with one difference that is discussed below). This component is able to place an on-resonance spectral component on drop port 518.

The filter depicted in FIG. 5A comprises a wavelength-dependent optical coupler as well as certain elements that are required to provide polarization diversity.

In the embodiment depicted in FIG. 5A, the wavelength-dependent coupler is a micro-resonator of the type previously discussed, which includes port waveguides 502 and 504 as well as loop waveguide 506.

The elements pertaining to polarization diversity comprise polarization splitter 510, polarization rotators 512 and 514, and polarization combiner 516.

The operation of the filter is now described. For this description, the input optical signal is assumed to comprise a single spectral component or wavelength $\lambda_1$ and the resonance wavelength of loop 506 is also $\lambda_1$.

Incoming optical signal 3, which exhibits both TE and TM polarization modes, is split into two signals K and L by polarization splitter 510. One of the signals, L, has TM polarization and the other signal, K, has TE polarization. The polarization of signal L is changed from TM to TE in polarization rotator 512. Signal L with TE polarization and signal K also with TE polarization approach loop waveguide 506 from opposite directions on port waveguide 502.

By virtue of the operation of loop waveguide 506, signals K and L are coupled to port waveguide 504. By virtue of the geometry of the arrangement, these signals propagate on port waveguide 504 in directions that are opposite to their propagation directions on port waveguide 502.

The polarization of signal K is changed from TE to TM in polarization rotator 514. Signal K, now TM polarized, and signal L, still TE polarized, are combined in polarization combiner 516 into signal M having both TE and TM polarizations. Signal 516 is then dropped at output port 518.

As discussed in the Background section, it is often important that TE- and TM-polarized signals that are propagating through the filter each experience the same environment and conditions. To that end, in some embodiments, port waveguides 502 and 504 have the same length. Furthermore, all signals pass through polarization splitter 510 and polarization combiner 516 and one of either polarization rotator 512 or 514.

The filter depicted in FIG. 5A is well adapted for use with an incoming optical signal that contains only those spectral components that will be dropped. The operation of that filter will, however, be less desirable for an incoming signal that contains spectral components that are not dropped by the filter. In particular, off-resonance spectral components will continue along port waveguide 502 and constitute reflections in the filter. These reflections are detrimental to operations on a component level as well as on a system level. In fact, a non-ideal filter cannot, of course, drop all power of even an on-resonance spectral component, so reflection can occur even if the signal contains only on-resonance spectral components. This is a disadvantage of this layout relative to the more complex prior-art polarization-diverse implementation that is depicted in FIG. 3B.

To address this drawback, some embodiments of a polarization-diverse optical device consistent with the present teachings are configured so that:

signals propagating along a port waveguide of a micro-resonator are always dropped by that micro-resonator or another micro-resonator on the same port waveguide; and/or an optical isolator is used.

This ensures that a signal that propagates in a given direction along a port waveguide does not continue on that waveguide and does not, ultimately, act as a reflection.

In some other embodiments of a polarization-diverse optical device consistent with the present teachings, wavelengths that would not otherwise be dropped via the operation of micro-resonators, etc., are extracted from the system via any of various wavelength-dump arrangements, such as grating couplers, MZI-based filters, and the like, as will be familiar to those skilled in the art.

Figure 5B:
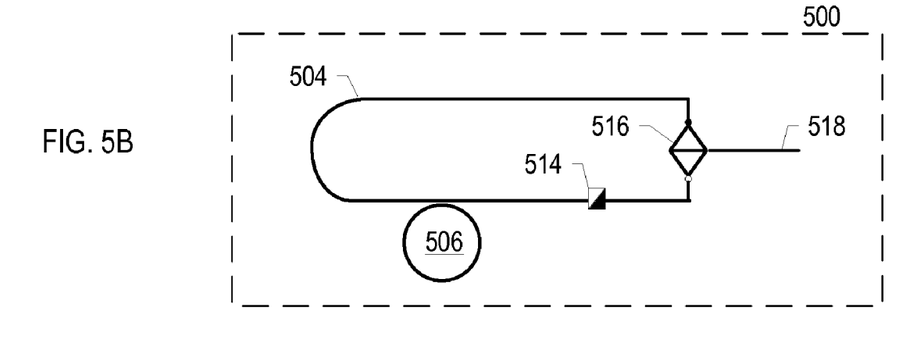
FIG. 5B depicts a simplified optical filter that serves as a building block for forming polarization-diverse optical components in accordance with the illustrative embodiment of the present invention.

Certain elements of the filter depicted in FIG. 5A are usually redundant when plural instances of that filter are used to create more complex optical components. FIG. 5B depicts filter 500, which is what remains of the filter in FIG. 5A after "redundant" elements are removed. Filter 500 serves as a "building block" for use in creating more complex, polarization-diverse optical components in accordance with the illustrative embodiment of the present invention. Filter 500 includes a portion of the wavelength selective optical coupler (i.e., the resonant element [e.g., loop waveguide 506, etc.] and one of the two port waveguides [i.e., port waveguide 504]), polarization rotator 514, and polarization combiner 516.

Figure 5C:
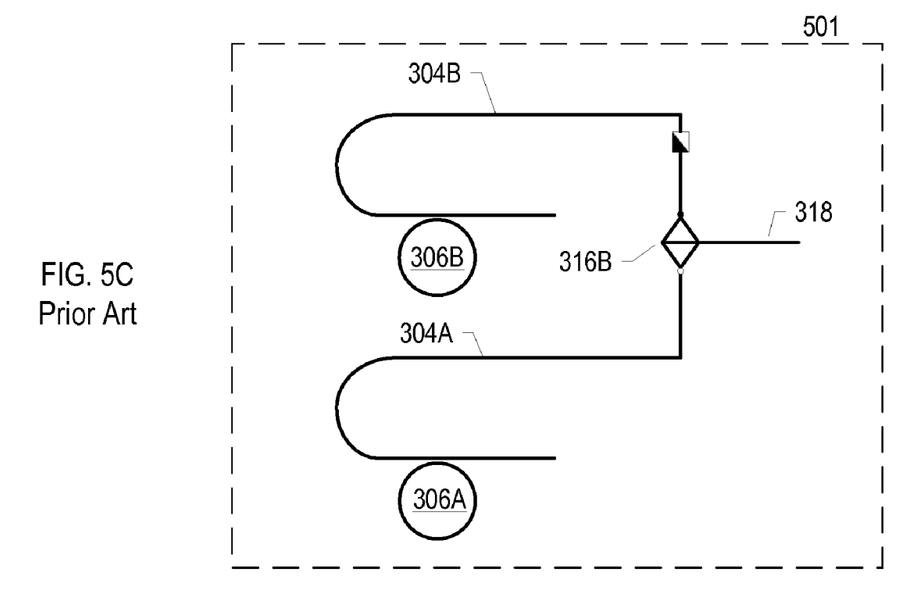
FIG. 5C depicts a simplified optical filter that serves as a building block for forming polarization-diverse optical components in the prior art

It is instructive to compare basic building-block filter 500 depicted in FIG. 5B with a basic building-block filter from prior-art polarization-diverse optical components, as shown in FIG. 5C. Filter 501 depicted in FIG. 5C is based on the filter that appears in FIG. 3B, but with contextually-redundant elements removed as is typically appropriate for use in relatively more complex devices.

Both filters 500 and 501 include a polarization rotator (514 and 314B) and a polarization combiner (516 and 316B). The key difference between building-block filter 500 disclosed herein and building-block filter 501 of the prior art is that:

Filter 500 requires one wavelength selective element (i.e., loop waveguide 506) per wavelength extracted per output port (i.e., output port 518).

Filter 501 requires two wavelength selective elements (i.e., loop waveguides 306A, 306B) per wavelength extracted per output port (i.e., output port 318).

It should be noted that the above characterization assumes that the wavelength selective element is capable of selecting or extracting only one wavelength from a signal. It is possible for a micro-resonator, for example, to be tunable to select any one of a plurality of wavelengths. In such a case, embodiments of the present invention (as well as the prior art) are likely to require less than one wavelength selective element per wavelength extracted, regardless of the manner in which polarization diversity is implemented.

Yet, it remains true that regardless of the manner in which the wavelength-selective element is operated, prior art filter 501 requires one wavelength-selective element per polarization state while filter 500 requires one wavelength selective element for both polarization states. In other words, polarization-diverse optical components in accordance with the illustrative embodiment will require one-half the number of wavelength-selective elements as required by prior-art polarization-diverse optical components.

An example of a relatively more complex polarization-diverse optical component that can be formed from a plurality of filters 500 or 501 (the prior art) is a 1×n wavelength demultiplexer. Embodiments of such a demultiplexer are depicted in FIGS. 6A and 6B.

Figure 6A:
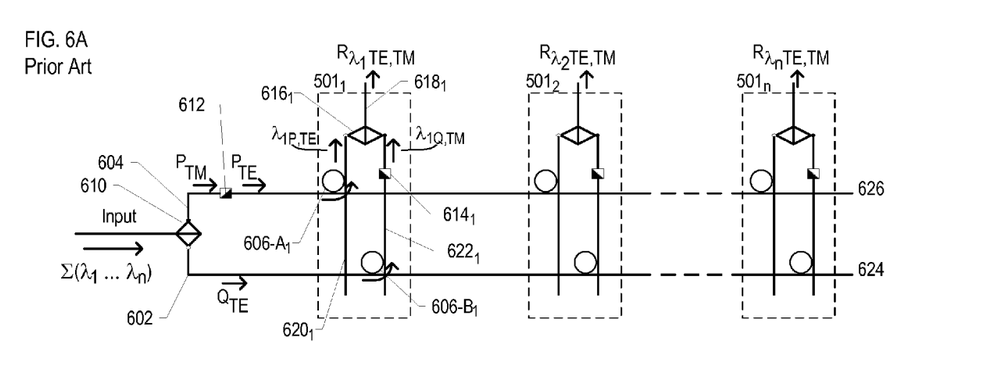
FIG. 6A depicts a polarization-diverse implementation of a 1×n wavelength demultiplexer in the prior art.
Figure 6B:
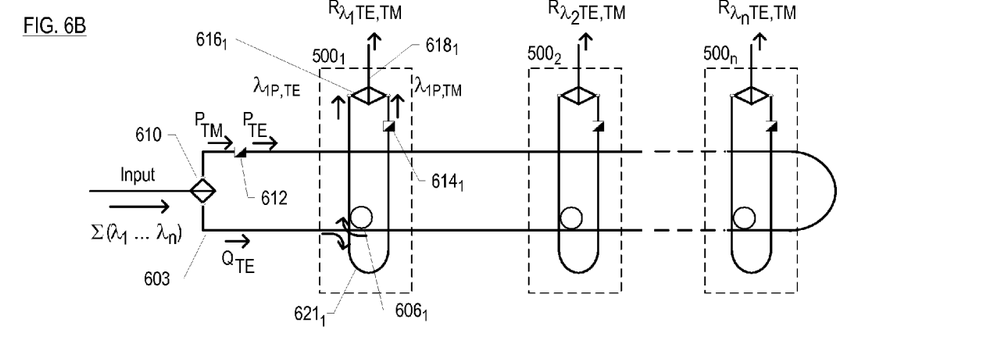
FIG. 6B depicts a polarization-diverse implementation of a 1×n wavelength demultiplexer in accordance with the illustrative embodiment of the present invention.

The polarization-diverse demultiplexer that is depicted in FIG. 6A, which is consistent with the prior art, employs unidirectional propagation through complementary pairs of micro-resonators (per wavelength filter). The polarization-diverse demultiplexer that is depicted in FIG. 6B is implemented in accordance with the present teachings, which employs bidirectional propagation through a single micro-resonator (per wavelength filter).

Prior-Art Polarization-Diverse 1×n Demultiplexer. Turning now to FIG. 6A, an embodiment of a prior-art polarization-diverse 1×n wavelength demultiplexer includes polarization splitter 610, polarization rotator 612, port waveguides 602 and 604, and a plurality of filters $501_i$, where i=1 . . . n, such as is depicted in FIG. 5C. Each filter $501_i$ includes two port waveguides $620_i$ and $622_i$, two loop waveguides 606-$A_i$ and 606-$B_i$, polarization combiner $616_i$, and drop port $618_i$.

A multi-wavelength input signal having spectral components $\lambda_1 \ldots \lambda_n$ is split into two signals P and Q by polarization splitter 610. Signal Q is launched into port waveguide 602 and signal P is launched into port waveguide 604. These signals have the same spectral components but different polarizations; signal P is TM polarized and signal Q is TE polarized.

Signal P has its polarization state rotated from TM to TE by polarization rotator 612. Signals P and Q then encounter first wavelength filter $501_1$. This filter is operative to extract and drop spectral component $\lambda_1$ from signals P and Q.

Assuming that spectral component $\lambda_1$ is present in signals P and Q (it will be present in both of these signals or neither signal), then that spectral component (originating from signal P) couples to port waveguide $620_1$ via loop waveguide 606-

$A_1$. Similarly, spectral component $\lambda_1$ (originating from signal Q) couples to port waveguide $622_1$ via loop waveguide $606\text{-}B_1$. Spectral component $\lambda_{1Q}$ propagating on port waveguide $622_1$ has its polarization state rotated from TE to TM.

Signal $\lambda_{1P}$ having a TE polarization state and signal $\lambda_{1Q}$ having a TM polarization state are combined in polarization combiner $616_1$ to form signal R. Signal R, having wavelength $\lambda_1$ and TE and TM polarization states, is dropped at port $618_1$.

Off-resonance light (i.e., spectral components $\lambda_2 \ldots \lambda_n$) in signals P and Q pass respective loop waveguides $606\text{-}A_1$ and $606\text{-}B_1$ and approach second wavelength filter $501_2$. The second filter is operative to extract and drop spectral component $\lambda_2$ from signals P and Q. The operation of this filter and successive filters $501_3 \ldots 501_n$ is analogous to the operation of filter $501_1$. As a consequence, all spectral components $\lambda_1 \ldots \lambda_n$ present in signals P and Q are eventually dropped. In that case, nothing appears at either pass-port 624 on port waveguide 602 or pass-port 626 on port waveguide 604.

Since the prior-art polarization-diverse implementation of a 1×n wavelength demultiplexer depicted in FIG. 6A employs filter 501 as a building block, it therefore requires:

> one waveguide-selective element per polarization per wavelength extracted per output port.

Polarization-Diverse 1×n Demultiplexer in accordance with the illustrative embodiment of the present invention. FIG. 6B is a polarization-diverse 1×n wavelength demultiplexer in accordance with the illustrative embodiment of the present invention. This implementation assumes that all spectral components present in the incoming multi-wavelength signal are dropped to a drop port. In some other embodiments, appropriate wavelength-dump devices are added to the layout of FIG. 6B to address situations in which not all spectral components in the incoming multi-wavelength signal are dropped to a drop port via the operation of a micro-resonator, etc. In some further embodiments, an optical isolator is used (to prevent reflections).

The demultiplexer depicted in FIG. 6B comprises: polarization splitter 610, polarization rotator 612, port waveguide 603, and a plurality of filters $500_i$, where $i=1 \ldots n$, such as are depicted in FIG. 5B. Each filter $500_i$ includes: port waveguide $621_i$, loop waveguide $606_i$, polarization combiner $616_i$, and drop port $618_i$.

A multi-wavelength input signal having wavelengths $\lambda_1 \ldots \lambda_n$ is split into two signals P and Q by polarization splitter 610. Signal Q, which has a TE polarization state, is launched into the lower leg of port waveguide 603. Signal P, which has TM polarization state, is launched into the upper leg of port waveguide 603. Both of these signals comprise the same spectral components.

Signal Q encounters first wavelength filter $500_1$. This filter is operative to extract and drop spectral component $\lambda_1$ from signals P and Q.

Spectral component $\lambda_1$ from signal Q couples to the left leg of port waveguide $621_1$ via loop waveguide $606_1$. Due to the geometry of the system, this coupled spectral component heads toward the right leg (i.e., initially "downward" in FIG. 6B) on port waveguide $621_1$. This new signal, $\lambda_{1Q}$, propagates toward polarization rotator $614_1$ where it has its polarization state changed from TE to TM.

Signal P propagates across the upper leg of port waveguide 103 toward the lower leg of that waveguide where it encounters filter $500_n$. On-resonance light (i.e., spectral component $\lambda_n$) is extracted from signal P by the loop wave guide in that filter. Off-resonance light (i.e., relative to filter $500_n$) continues propagating along the lower leg of port waveguide 603 and is extracted by successive filters $500_{n\text{-}1} \ldots 500_2$ until a signal having only spectral component $\lambda_1$ reaches filter $500_1$. That spectral component couples to the left leg of port waveguide $621_1$ via loop wave guide $606_1$. This signal, $\lambda_{1P}$, propagates along the left leg of port waveguide $621_1$ toward polarization combiner $616_1$. Signal $\lambda_{1P}$ having a TE polarization state and signal $\lambda_{1Q}$ having a TM polarization state are combined in polarization combiner $616_1$ to form signal R. Signal R, which has wavelength $\lambda_1$ and TE and TM polarization states, is dropped at port $618_1$.

To generalize, on-resonance light having TE polarization and originating from signal Q will couple to port waveguide $621_i$ via loop wave guide $606_i$ and head toward polarization rotator $614_i$. That light will have its polarization state changed from TE to TM. On-resonance light having TE polarization and originating from signal Q will couple to port waveguide $621_i$ via loop wave guide $606_i$ and head away from polarization rotator $614_i$.

Since the polarization-diverse implementation of a 1×n wavelength demultiplexer that is depicted in FIG. 6B employs filter 500 as a building block, it requires:

> one waveguide-selective element per two polarizations per wavelength extracted per output port.

In other words, as previously described, polarization-diverse optical devices that are implemented in accordance with the illustrative embodiment of the present invention require one-half the number of wavelength selective elements (e.g., loop waveguides, etc.) that is required for a polarization-diverse implementation in accordance with the prior art.

It is noteworthy that, in FIG. 6B, the distance traversed to each drop port $618_i$ by light originating from signal Q appears to be shorter, in all cases, than the distance traversed to the drop ports by light originating from signal P. Even though both signals are propagating primarily in a TE-polarized state, the difference in distance traveled will delay one of the signals with respect to the other. In certain systems, this will introduce timing errors (e.g., jitter, etc.) In some embodiments, if the path lengths are different and timing errors are not acceptable, a time-delay component(s) is introduced into the shorter path to rectify this problem.

For example, in the demultiplexer that is depicted in FIG. 6B, assume that the distance traversed by Q-based signals is shorter than the distance traversed by P-based signals. This difference in path length can be compensated for by introducing time-delay elements in the right leg of port waveguide $621_i$ of each filter $500_i$, $i=1$, n. Clearly, each filter will require a different delay time. If the time delay is known for each filter, a fixed time-delay element can be used. If the delay is not known, then adjustable time-delay elements can be used. Examples of suitable time-delay elements include a micro-resonator with or without an adjustable coupling, an MZI cascade filter, etc. Those skilled in the art, in conjunction with the present disclosure, will know how to specify and use time-delay elements to prevent timing errors.

An alternative and perhaps more preferred solution is to use identical lengths of waveguide, which will provide a wavelength-independent solution to this issue. This is accomplished by lengthening the shorter paths (downstream of the wavelength selective element). More specifically, assume that $TD_P$ is the total delay for signal P (i.e., the TE mode $P_{TE}$)

when propagating from polarization splitter 610 to wavelength-selective element 606₁. Likewise, $TD_Q$ is the total delay for signal Q (i.e., the TE mode $Q_{TE}$) when propagating from polarization splitter 610 to wavelength-selective element 606₁. Further assume, as seems reasonable from FIG. 6B, the $TD_P$ is larger than $TD_Q$ (in fact, there will always be some difference). This difference can be corrected by lengthening the "right" leg of waveguide 621₁. That is the preferred location whether a length-compensation (extra waveguide) or a phase delay (e.g., a micro-resonator, etc.) is provided.

Figure 7A:
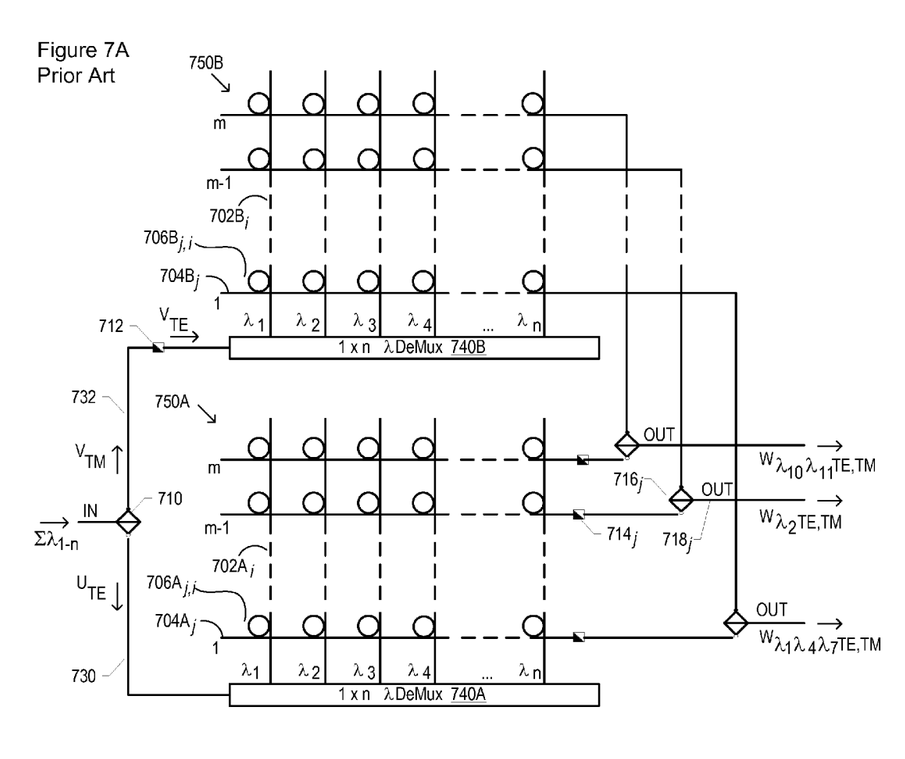
FIG. 7A depicts a polarization-diverse implementation of an n×m wavelength router in the prior art.
Figure 7B:
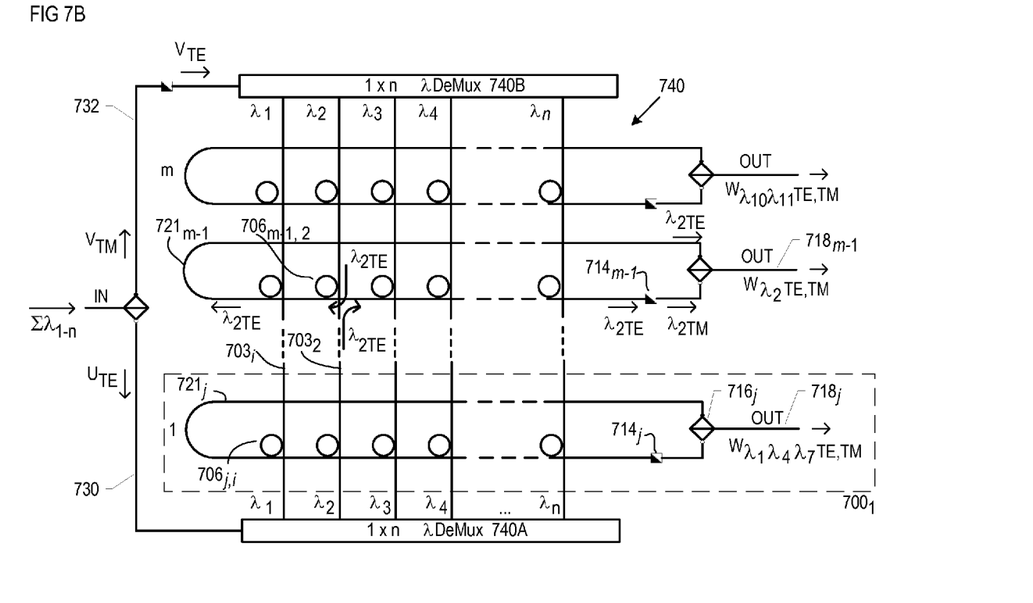
FIG. 7B depicts a polarization-diverse implementation of an n×m wavelength in accordance with the illustrative embodiment of the present invention.

FIGS. 7A and 7B depict another relatively more-complex optical component for the purpose of illustrating the difference between the way polarization diversity is implemented in the prior art versus its implementation in accordance with the illustrative embodiment of the present invention.

In particular, FIGS. 7A and 7B depict two versions of a polarization-diverse m×n wavelength router. An m×n wavelength router is capable of placing any of n spectral components in a multi-wavelength input signal on any of m outputs of the router in any required combination. The polarization-diverse router that is depicted in FIG. 7A is implemented in accordance with the prior-art, which employs unidirectional propagation through complementary pairs of resonators (per wavelength). On the other hand, the polarization-diverse router that is depicted in FIG. 7B is implemented in accordance with the present teachings and employs bidirectional propagation through a single resonator (per wavelength).

Figure 7C:
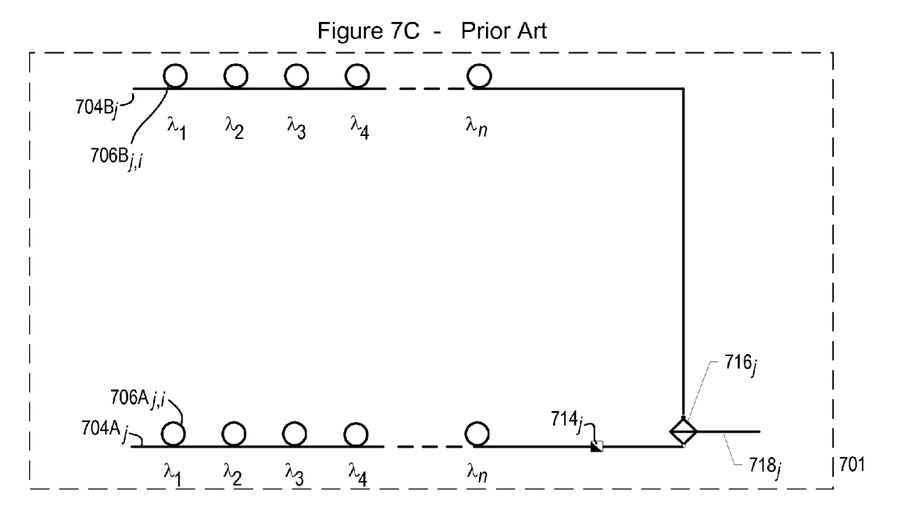
FIG. 7C depicts a filter that is used as a building block in forming the prior-art router of FIG. 7A.

The routers depicted in FIGS. 7A and 7B use slightly different versions of the basic "building block" filters 500 and 501. The alternative versions of the filters are depicted in FIG. 7C (prior-art filter 701) and FIG. 7D (filter 700). The difference between filters 500 and 501 on the one hand and filters 700 and 701 on the other hand is that the latter filters are each capable of extracting any one of a plurality of different spectral components or wavelengths contained in a multi-wavelength signal. This is due to the presence of a plurality of loop waveguides in each filter. But, as is evident from FIGS. 7C and 7D, the prior-art still requires one wavelength-selective element per polarization per wavelength per output while a filter in accordance with the illustrative embodiment requires only one-half of that number.

Prior-Art Polarization-Diverse m×n Wavelength Router. Turning now to FIG. 7A, an embodiment of a prior-art, polarization-diverse m×n wavelength router includes polarization splitter 710, polarization rotator 712, waveguides 730 and 732, 1×n demultiplexers 740A and 740B, input port waveguides 702$A_i$ and 702$B_i$, i=1, n, and a plurality of filters 701$_j$, j=1, m.

To maintain the clarity of FIG. 7A, the filters 701$_j$ are not explicitly identified in that Figure. Rather, the structure of filter 701$_j$ is specifically identified in FIG. 7C. As depicted in FIG. 7C, each filter 701$_j$, j=1, m, includes one output port waveguide 704$A_j$ and one output port waveguide 704$B_j$, a linear array of loop waveguides 706$A_{j,i}$, i=1, n and a linear array of loop waveguides 706$B_{j,i}$, i=1, n, one polarization rotator 714$_j$, and one polarization combiner 716$_i$.

Output port waveguides 704$A_j$, j=1, m, and input port waveguides 702$A_i$, i=1, n collectively define port-waveguide array 750A. Likewise, output port waveguides 704$B_j$, j=1, m, and input port waveguides 702$B_i$, i=1, n collectively define port-waveguide array 750B.

In operation, a multi-wavelength input signal having spectral components $\lambda_1 \ldots \lambda_n$ is split into two signals U and V by polarization splitter 710. Signal U is launched into waveguide 730 and signal V is launched into waveguide 732. These signals comprise the same spectral components but have different polarizations; in particular, signal U is TE polarized and signal V is TM polarized.

Signal V has its polarization state rotated from TM to TE by polarization rotator 712 and propagates to 1×n wavelength demultiplexer 740B. Signal U propagates to 1×n wavelength demultiplexer 740A. The 1×n demultiplexers can be implemented, for example, as shown in FIG. 6A.

The demultiplexers 740A and 740B resolve respective signals U and V into spectral components $\lambda_1 \ldots \lambda_n$. Each such spectral component $\lambda_1 \ldots \lambda_n$ that exits demultiplexer 740A is launched onto a respective input port waveguide 702$A_i$, i=1, n. Likewise, each spectral component $\lambda_1 \ldots \lambda_n$ that exits demultiplexer 740B is launched onto a respective input port waveguide 702$B_i$, i=1, n.

Each input port waveguide 702$A_i$, i=1, n is disposed in evanescent-coupling relation with a number, m, of loop waveguides 706$A_{j,i}$. And each of those loop waveguides is in evanescent-coupling relation with an output port waveguides 704$A_j$ in each of filters 701$_j$. As a consequence, each loop waveguide 706$A_{j,i}$ in port-waveguide array 750A is operable to couple on-resonance light from an input port waveguide 702$A_i$ to an output port waveguide 704$A_j$.

The resonant wavelength of each loop waveguide 706$A_{j,i}$ that is coupled to a given input port waveguide 702$A_i$ is controllable to be either on-resonance or off-resonance for a particular wavelength $\lambda_i$. Control can be implemented, for example, via electro-optic or thermo-optic tuning.

For example, the resonance wavelength of any loop waveguide 706$A_{j,1}$ j=1, m that is in evanescent-coupling relation with input port waveguide 702$A_1$ can be tuned to be on-resonance for $\lambda_1$. This enables spectral component $\lambda_1$, for example, to be extracted by any one of filters 701$_j$ and placed on any one of output channels 718$_j$, j=1, m. In particular, to drop a given spectral component, say $\lambda_1$, to a particular output port waveguide, say 704$A_1$, loop waveguide 706$A_{1,1}$ is tuned to be on-resonance, while all other loop waveguides 706$A_{j,1}$, j=2, m remain off-resonance. In similar fashion, each of the other spectral components $\lambda_2 \ldots \lambda_n$ in the input signal can be dropped to any one of output ports 718$_j$, j=1, m.

The operation of port-waveguide array 750B is identical to that of port-waveguide array 750A described above.

Since signal V has its polarization state changed to "TE" before reaching port-waveguide arrays 750B, that signal, as it enters demultiplexer 740B, has the same polarization state as signal U entering demultiplexer 740A.

All spectral components propagating along output port waveguides 704$A_j$ have their polarization state changed from "TE" to "TM" and are led to a respective polarization combiner 716$_j$. Similarly, the spectral component(s) appearing on a given output port waveguide 704$B_j$ in port-waveguide array 750B are led to the appropriate polarization combiner 716$_j$. The spectral components exiting port-waveguide array 750B have a TE polarization state.

At each polarization combiner 716$_j$, j=1, m, spectral components having TE polarization state and (the same spectral components) having TM polarization state are combined creating signals $W_j$, j=1, m. Signals $W_j$ appear on respective output channels 718$_j$, j=1, m. In these Figures, several spectral components are shown appearing at the outputs of the router (i.e., spectral components $\lambda_{10}$, $\lambda_{11}$ at output 718$_m$, spectral component $\lambda_2$ at output 718$_{m-1}$, and spectral components $\lambda_1$, $\lambda_4$, and $\lambda_7$ at output 718$_1$. These were arbitrarily assigned and are shown simply for the purpose of illustrating the operation of the router.

Like the prior-art polarization-diverse implementation of the 1×n demultiplexer that is depicted in FIG. 6A, the prior-art polarization-diverse implementation of an m×n wavelength router that is depicted in FIG. 7A requires, per output port:

> one loop waveguide per polarization per wavelength.

As necessary, time-delay elements can be added to the port waveguides to avoid timing delays. Or, alternatively, the port waveguides can be sized to avoid timing delays.

Polarization-Diverse m×n Wavelength Router in accordance with the illustrative embodiment of the present invention. FIG. 7B depicts a polarization-diverse, m×n wavelength router in accordance with the illustrative embodiment of the present invention. The embodiment that is depicted in FIG. 7B is premised on an assumption that all spectral components (i.e., wavelengths) present in the incoming multi-wavelength signal will be directed to an appropriate output channel. In some other embodiments, appropriate wavelength-dump devices are added to the layout of FIG. 7B to address situations in which not all spectral components in the incoming multi-wavelength signal are directed to an output channel via the operation of a micro-resonator, etc.

The embodiment of a polarization-diverse m×n optical router that is depicted in FIG. 7B includes polarization splitter 710, polarization rotator 712, waveguides 730 and 732, (two) 1×n demultiplexers 740A and 740B, input port waveguides 703$_i$, i=1, n, and filters 700$_j$, j=1, m.

Figure 7D:
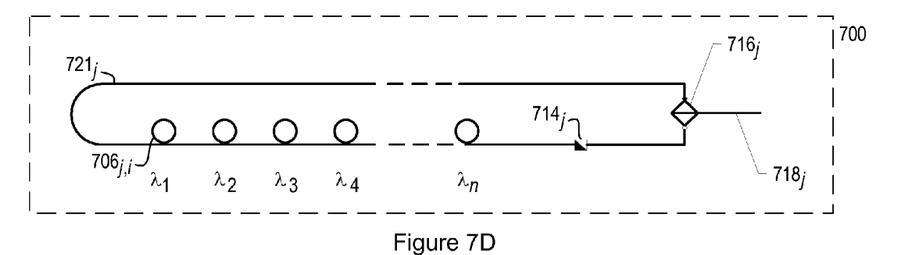
FIG. 7D depicts a filter that is used as a building block in forming the n×m router of FIG. 7B.

As depicted in isolation in FIG. 7D, or in the context of the full m×n router in FIG. 7B, filter 700$_j$, j=1, m comprises output port waveguides 721$_j$, a linear array of loop waveguides 706$_{j,i}$, i=1, n, a polarization rotator 714$_j$, and a polarization combiners 716$_j$.

Output port waveguides 721$_j$, j=1, m, and input port waveguides 703$_i$, i=1, n collectively define port-waveguide array 740.

A multi-wavelength input signal having spectral components $\lambda_1 \ldots \lambda_n$ is split into two signals U and V by polarization splitter 710. Signal U is launched into waveguide 730 and signal V is launched into waveguide 732. These signals have the same spectral components but different polarizations; signal U is TE polarized and signal V is TM polarized.

Signal V has its polarization state rotated from TM to TE by polarization rotator 712 and propagates to 1×n wavelength demultiplexer 740B. Signal U propagates to 1×n wavelength demultiplexer 740A. The 1×n demultiplexers can be implemented, for example, as shown in FIG. 6B.

The demultiplexers 740A and 740B resolve respective signals U and V into individual spectral components $\lambda_1 \ldots \lambda_n$. Each such spectral component $\lambda_1 \ldots \lambda_n$ that exits demultiplexer 740A is launched onto a respective input port waveguide 703$_i$, i=1, n, heading "upward" (in FIG. 7B). Likewise, each spectral component $\lambda_1 \ldots \lambda_n$ that exits demultiplexer 740B is launched onto the appropriate input port waveguide 703$_i$, i=1, n, heading "downward" (in FIG. 7B).

Each input port waveguide 703$_i$, i=1, n is disposed in evanescent-coupling relation with a number, m, of loop waveguides 706$_{j,i}$. And each of those loop waveguides is in evanescent-coupling relation with an output port waveguides 721$_j$.

All loop waveguides 706$_{j,i}$ that are coupled to a given input port waveguide 703$_i$ are tunable to have the same resonance wavelength. For example, all loop waveguides 706$_{j,1}$ j=1, m that are in evanescent-coupling relation with input port waveguide 703$_1$ can be tuned to be on-resonance for wavelength $\lambda_1$. This enables spectral component $\lambda_1$, for example, to be extracted by any one (or more) of filters 700$_j$, j=1, m, and dropped to a corresponding output channels 718$_j$, j=1, m. In particular, to drop spectral component $\lambda_2$, for example, to output 718$_{m-1}$, loop waveguide 706$_{m-1,2}$ in filter 700$_{m-1}$ is tuned to be on-resonance, while all other loop waveguides 706$_{j,2}$ in all other filters remain off-resonance. In similar fashion, each of the other spectral components in the input signal can be directed to any one of output ports 718$_j$, j=1, m.

The coupling operation is examined in further detail by way of the following example, wherein spectral component $\lambda_2$ is to be routed to output port 718$_{m-1}$.

Spectral component $\lambda_2$ from signal U and having a TE polarization state is output from demultiplexer 740A and launched onto input port waveguide 703$_2$ heading "upward." Similarly, spectral component $\lambda_2$ from signal V and also having a TE polarization state is output from demultiplexer 740B and launched onto the same input port waveguide 703$_2$ heading "downward."

Spectral component $\lambda_2$ that was demultiplexed from signal V is coupled to output port waveguide 721$_{m-1}$ via the operation of loop waveguide 706$_{m-1,2}$ of filter 700$_{m-1}$. By virtue of the geometry of this arrangement, the coupled spectral component heads "leftward" toward the upper leg of output port waveguide 721$_{m-1}$. Spectral component $\lambda_2$ that was demultiplexed from signal U is likewise coupled to output port waveguide 721$_{m-1}$ via the operation of loop waveguide 706$_{m-1,2}$. But this signal heads "rightward," remaining on the lower leg of output port waveguide 721$_{m-1}$.

Spectral component $\lambda_2$ that is heading rightward in the lower leg has its polarization state changed from TE to TM by polarization rotator 714$_{m-1}$. At polarization combiner 716$_{m-1}$, the signals from both the lower and upper legs of output port waveguide 721$_{m-1}$ are combined to form signal W. This signal has a wavelength $\lambda_2$ and exhibits both TE and TM polarizations.

It is apparent from FIG. 7B that a polarization-diverse implementation of an m×n wavelength router in accordance with the illustrative embodiment of the present invention requires, per output port:

> one loop waveguide per two polarizations per wavelength.

Again, the number of loops required for polarization-diverse implementations according to the illustrative embodiment of the present invention is one-half the number that is required for the prior-art polarization-diverse implementation depicted in FIG. 7A.

As necessary, time-delay elements can be added to the port waveguides to avoid timing delays. Or, alternatively, the port waveguides can be sized to avoid timing delays.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Nor are the absolute or relative positions of elements within a drawing necessarily indicative of their actual or relative position in actual embodiments of the device. This is due to the difficulty, among any other reasons, of representing three-dimensional objects in two dimensions as a drawing. For that reason, it is to be understood that terms that indicate a direction or relative position, such as "lower," "upper," "left," "right," etc., when used herein in conjunction with the description of the accompanying drawings, are simply for the purpose of aiding a reader in locating the referenced feature in the drawing.

Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An optical device comprising a first filter, wherein said first filter comprises:
   a resonant element and a first waveguide, wherein:
   (a) said resonant element has a resonance at a first wavelength; and
   (b) said resonant element couples, onto said first waveguide, a first pair of spectral components, wherein:
      (i) each spectral component in said first pair have said first wavelength and a first polarization state; and
      (ii) said spectral components in said first pair propagate in different directions along said first waveguide;
   a first polarization rotator, wherein said first polarization rotator changes said first polarization state of one of said spectral components in said first pair to a second polarization state;
   a first polarization combiner, wherein said first polarization combiner receives said two spectral components and combines them to form a first filtered signal, wherein said first filtered signal has said first wavelength, said first polarization state, and said second polarization state;
   a polarization splitter, wherein said polarization splitter receives an optical signal and splits said optical signal into a first optical signal having said first polarization state and a second optical signal having said second polarization state, and wherein said first pair of spectral components are extracted from said first optical signal and said second optical signal; and
   a primary polarization rotator, wherein said primary polarization rotator changes said second polarization state of said second optical signal to said first polarization state.

2. The optical device of claim 1 further comprising a second filter, wherein, said second filter comprises a second resonant element that has a resonance at a second wavelength, and a second polarization rotator, and a second polarization combiner.

3. The optical device of claim 2, wherein said optical device is a 1×n demultiplexer.

4. The optical device of claim 2, wherein said optical device is an m×n wavelength router.

* * * * *